United States Patent [19]

McFarland

[11] Patent Number: 5,682,840
[45] Date of Patent: Nov. 4, 1997

[54] LEASH REACTIVE SMALL ANIMAL RESTRAINT DEVICES

[76] Inventor: Martin A. McFarland, 9037 Tahoe La., Boulder, Colo. 80301

[21] Appl. No.: 544,040

[22] Filed: Oct. 17, 1995

[51] Int. Cl.⁶ .......................... A01K 15/00; A01K 27/00
[52] U.S. Cl. .......................... 119/856; 119/792; 119/907
[58] Field of Search .................. 119/856, 864, 119/792, 793, 905, 907

[56] References Cited

U.S. PATENT DOCUMENTS

| | | |
|---|---|---|
| 278,931 | 6/1883 | Gibbons. |
| 296,076 | 4/1884 | Shelby. |
| 376,872 | 1/1888 | Mahoney. |
| 613,334 | 11/1898 | Thompson. |
| 626,317 | 6/1899 | Brown. |
| 1,614,083 | 1/1927 | Plantico. |
| 1,685,435 | 9/1928 | Philbrick. |
| 1,800,421 | 4/1931 | Wickersham et al. |
| 1,879,991 | 9/1932 | Pratt. |
| 1,906,043 | 4/1933 | Berstein ........................ 119/856 |
| 2,026,383 | 12/1935 | Gyulay. |
| 2,187,021 | 1/1940 | Everson ........................ 119/907 |
| 2,196,627 | 4/1940 | De Sanctis. |
| 2,233,397 | 3/1941 | Bloom ........................ 119/907 X |
| 2,289,802 | 7/1942 | Norton ........................ 119/793 |
| 2,289,832 | 7/1942 | Flesner. |
| 2,458,489 | 1/1949 | Hallander ........................ 119/907 |
| 2,464,867 | 2/1949 | Johnson ........................ 119/907 |
| 2,605,744 | 8/1952 | Urbanski. |
| 2,670,712 | 2/1954 | Patience et al. |
| 2,703,535 | 3/1955 | Hirt. |
| 2,778,335 | 1/1957 | Hirsch ........................ 119/907 |
| 2,798,458 | 7/1957 | Odermatt. |
| 2,826,172 | 3/1958 | Buckle et al. |
| 2,956,541 | 10/1960 | Rall. |
| 2,998,008 | 8/1961 | Klesa. |
| 3,310,034 | 3/1967 | Dishart. |
| 3,311,088 | 3/1967 | Peterlin. |
| 3,709,491 | 1/1973 | Minchin ........................ 273/58 C |
| 3,769,939 | 11/1973 | Wais et al. ........................ 119/856 |
| 3,867,905 | 2/1975 | Vail, Jr. ........................ 119/793 |
| 3,994,264 | 11/1976 | Flynt ........................ 119/815 |
| 4,060,056 | 11/1977 | Maietta ........................ 119/793 |
| 4,303,041 | 12/1981 | Thompson et al. ........................ 482/66 |
| 4,597,359 | 7/1986 | Moorman ........................ 119/907 |
| 4,676,198 | 6/1987 | Murray ........................ 119/856 |
| 4,729,345 | 3/1988 | Anderson ........................ 119/770 |
| 4,964,369 | 10/1990 | Sporn ........................ 119/864 |
| 5,003,930 | 4/1991 | Shields ........................ 119/864 |
| 5,150,667 | 9/1992 | Salidrigas ........................ 119/863 |
| 5,247,905 | 9/1993 | Arakawa ........................ 119/907 |
| 5,325,819 | 7/1994 | Krauss ........................ 119/856 |
| 5,329,885 | 7/1994 | Sporn ........................ 119/864 |
| 5,335,627 | 8/1994 | Bandimere ........................ 119/856 |
| 5,359,964 | 11/1994 | Sporn ........................ 119/864 |
| 5,370,083 | 12/1994 | Sporn ........................ 119/864 |
| 5,383,426 | 1/1995 | Krauss ........................ 119/793 |
| 5,485,810 | 1/1996 | Sporn ........................ 119/907 X |

*Primary Examiner*—Robert P. Swiatek
*Assistant Examiner*—Elizabeth Shaw
*Attorney, Agent, or Firm*—Donald W. Margolis; Emery L. Tracy

[57] ABSTRACT

Restraining devices for use with small quadruped animals are provided. The restraining devices are comprised of a pair of substantially equal length cords, each cord having a first end, a second end opposite the first end and an intermediate portion between the first and second ends. A mechanism is secured to the first end of the cords for receiving at least a portion of the intermediate portions of the cords with the intermediate portions each forming a loop to be disposed within one of the foreleg pits of the small animal whereby an animal straining against a person holding the second ends results in a pressure applied to the foreleg pits of the animal causing the animal to react.

15 Claims, 3 Drawing Sheets

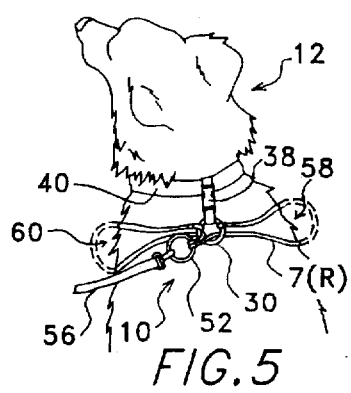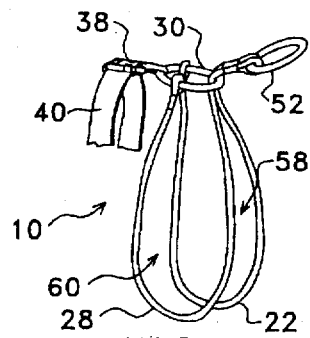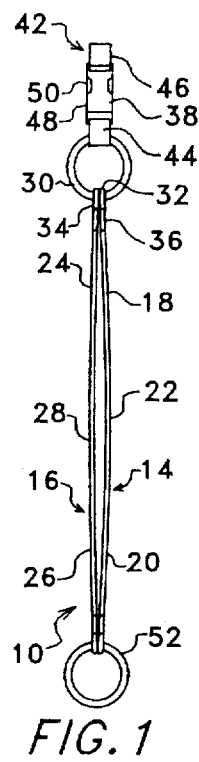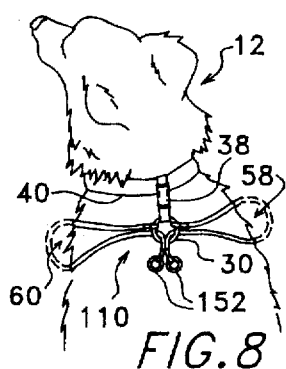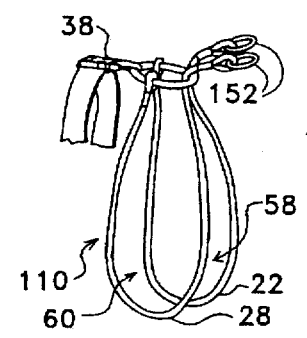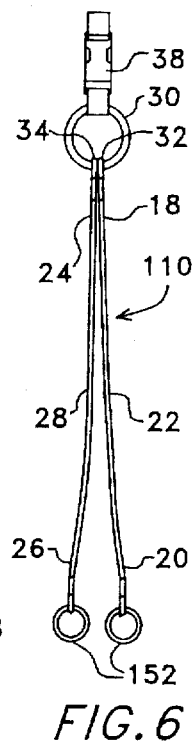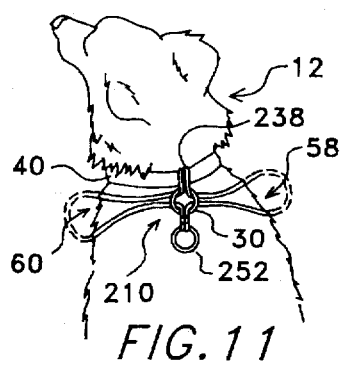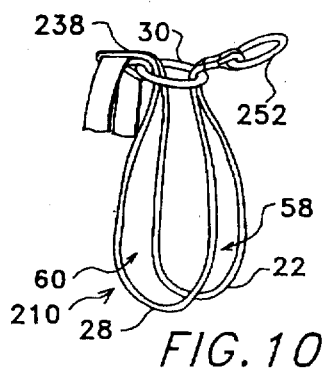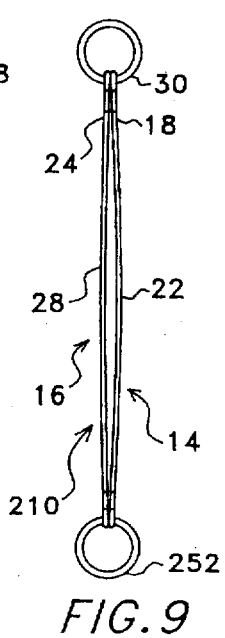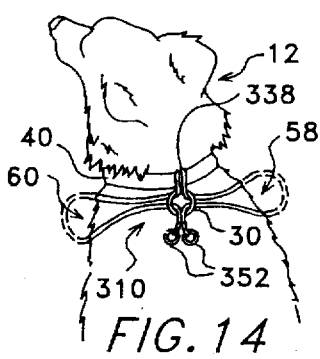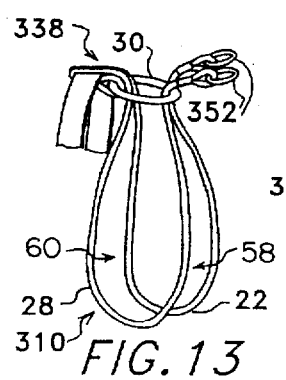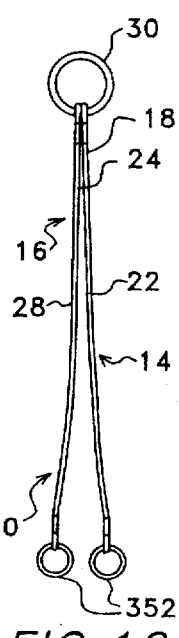

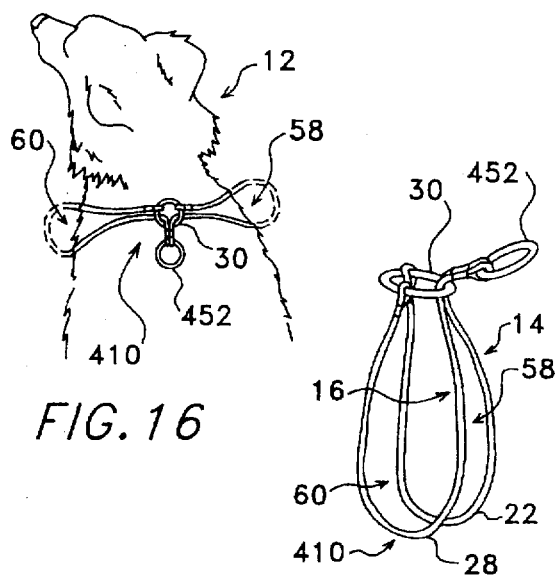
FIG. 16
FIG. 15
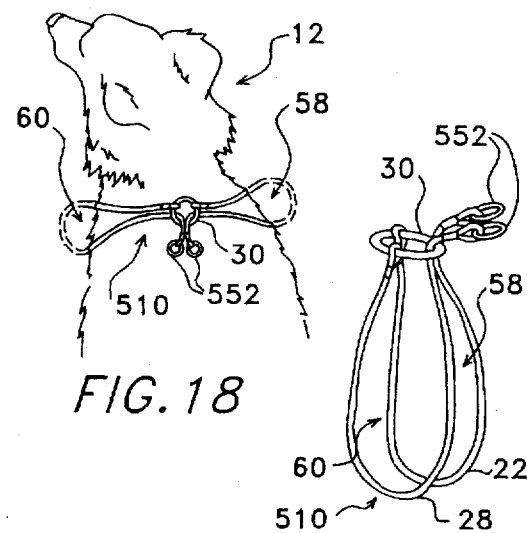
FIG. 18
FIG. 17
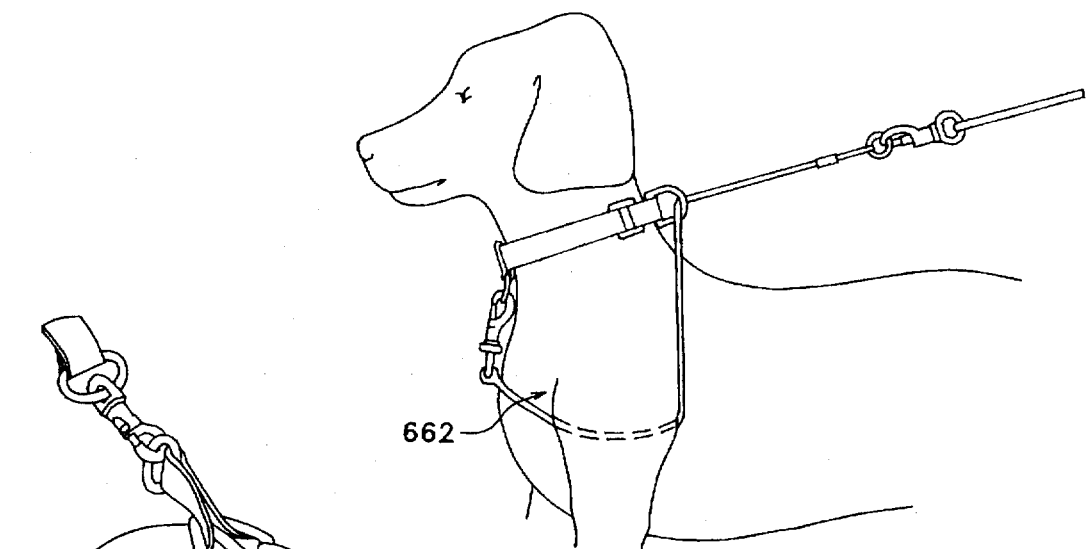
FIG. 19
(PRIOR ART)
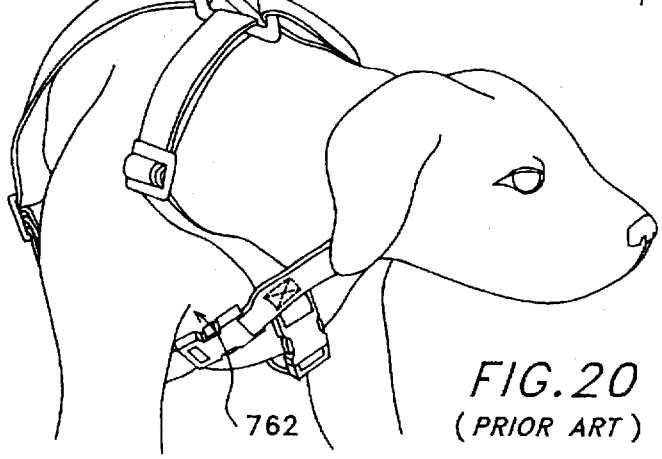
FIG. 20
(PRIOR ART)

LEASH REACTIVE SMALL ANIMAL RESTRAINT DEVICES

BACKGROUND OF THE INVENTION

1. Field of the Invention

The present invention relates to animal husbandry restraining devices in the form of tethers for small quadruped animals, and, in particular, it relates to restraint devices for small quadruped animals which, by use of a leash, apply pressure to the sensitive area of the foreleg pits of the animals to cause and encourage the animals to react in a desired manner.

2. Discussion of the Prior Art

In the prior art, there are many different types of small quadruped animal restraint devices, many in the form of harnesses, which utilize a variety of cords or straps which are arranged in a complex manner, manipulated or attached to each other for use in controlling small animals in a variety of situations. These harnesses have been devised for use with a leash to restrain small quadruped animals in a manner that will maintain maximum control and domination of the animal. Additionally, most of the restraint devices are intended to be used with various specially adapted collars and/or leashes. Many types of such restraint devices also include additional clips, hooks and fasteners to connect to a specially designed collar, and arranged in a fashion around the forward torso and neck of the small quadruped animal.

When a person or master takes a dog for a walk or is working to train a dog, an untrained or disobedient dog normally tends to strain against a leash attached to a collar or a dog harness. It is important that the collar or harness avoids choking the throat of the dog or applying undue pressure on the dog's throat muscles, airway and nerves, because choking or pressure on the throat could permanently and adversely affect the lungs and heart of the dog. Some forms of the prior art restraining devices do not act to choke the dog. However, these restraining devices do not act to discourage the dog from straining against the leash. Ironically, because this form of harness is non-choking, nothing inhibits such straining.

To prevent the straining against the leash as discussed above, hobble-type dog restraint devices are known such as the type of harness described in the Patience et al U.S. Pat. No. 2,670,712. Hobble-type harnesses generally permit free movement of the animal but, when the dog attempts to run away or otherwise get out of control, the harness restricts the action of the forelegs by hobbling the dog. Controlling a dog by hobbling makes the dog unstable, and is potentially dangerous to the health of the animal by imposing an actual physical restraint on the forelegs and its entire effectiveness depends directly on the strength of the dog and the person in control. If a large dog has enough strength in his forelegs to resist the movement of the leg loops, the restraining device may fail to restrain the dog, particularly if he succeeds in seizing the leash from the hands of the person.

Other types of harnesses attempt to restrain by a applying forces to the forelegs other than by hobbling. These include Sporn U.S. Pat. No. 4,964,369 as illustrated in FIG. 19, and Krauss U.S. Pat. Nos. 5,325,819 and 5,383,426. All of these references discloses that the sensitive foreleg pit area can be used to motivate the dog to cease straining against a leash, with minimal physical force from the master. All of these references disclose dog harnesses with a leash attachable. When installed on the dog, the harness acts to inhibit the dog from straining against the leash, without however, producing a choking action. The harness comprises a collar that encircles the neck of the dog, a leash attachment, and a means for producing restraint cables for the left and right foreleg pit area of the dog. A leash attachment is mounted by some means to a restraint cable. The restraint cable is connected to the center rear area of the collar by slip rings that by some means produce loops that go loosely under the left and right foreleg pits of the dog and then are connected by some means to the center front area of the collar. When the harnessed dog strains at the leash, the tension between the leash and the dog acts to tighten the restraint cables which then impose a pressure on the foreleg pits. Because these pits are highly sensitive, the dog, in order to relieve this pressure, will then cease to strain against the leash and thereby again loosen the restraint cables.

While these prior art type of harnesses are effective, they each require a special collar, with its size appropriate to the neck size of the dog, which special collar has incorporated into its structure the necessary cable attachment assemblies and slip rings. The inclusion of a special collar in the design of this type of harness significantly increases its manufacturing costs and the end user may be forced to have two collars for the dog if they choose not to use the provided special collar for the times when the dog does not need the restraining cable mechanism. Their effectiveness may also be limited by the dog's neck and the distance between their upper and lower collar connections. As shown in FIG. 19 of the present application, at 662, this distance prevents the leg loops from being able to completely contact and constrict the anterior portion of the dog's sensitive foreleg pit area.

Harness mechanisms that do not require a special collar are shown in Bandimere U.S. Pat. Nos. 5,335,627; and in Sporn U.S. Pat. Nos. 5,329,885; 5,359,964; and 5,370,083, see FIG. 20 of the present application as to the Sporn references. These latter Sporn references teach harness mechanisms which are comprised of a pair of loops that depend from a leash coupling junction at which the loops are joined, the loops being angled at the junction with respect to each other so that they cross over at a crossover site below the junction. When the harness is installed on the dog, the coupling junction, to which a leash is connected, then overlies the dog's shoulder intermediate to the right and left forelegs, and the crossover site lies under the dog's chest, one loop running from this site through the crotch between the chest and the left foreleg and back to the junction, the other loop running from this site through the right foreleg crotch and back to the junction. Should the leash attached to the junction of the harness be strained, the harness loops then ride up the crotches to engage and apply pressure to the sensitive pits of the forelegs. While these latter Sporn harness systems do not require a special collar with attachment and slip ring assemblies, they have other shortcomings. The Spore systems require that the leg loops cross over at the leash attachment and at the chest of the dog. Unfortunately, in this design the leg loops encircle the chest of the dog as they pass from the coupling junction over the dog's shoulder, across the chest, under the foreleg pit area on the opposite side of the dog, and then back up through the coupling junction to the leash attachment. The chest cavity of the dog limits how small the leg loops can constrict to apply pressure to the dog's foreleg pits. As shown in FIG. 20 of the present application at 762, the neck of the dog also prevents the leg loops from applying pressure to the anterior aspect of the foreleg pits of the dog. Therefore, the effectiveness of the device taught by Sporn is reduced.

Bandimere U.S. Pat. No. 5,335,627 discloses a harness mechanism that has a rectangularly shaped slotted plate for resting on the back of the animal, rearwardly of its forward shoulders, and a single control strap adapted to be attached to a leash and for cooperating with pairs of rings for defining right and left foreleg slip loops. A pair of restraining straps pass through the rings and are coupled to the plate by a latching arrangement, cooperate with the slip loops to form a block and tackle arrangement which utilizes a pulling force exerted by the animal, to exert a restraining force across the upper foreleg muscles of the animal when the leash is held in a substantially stationary position. It is understood that the restraining strap is a large flat piece of material which slides along the underside of the chest of the animal and across the foreleg muscles to distribute the exerted force against the outside foreleg muscles for restraining purposes. Such a distributed force restraining the animal without causing the animal to experience unwanted and undesired pain in the foreleg pit area. However, the Bandimere harness assembly regresses back to a hobble effect mechanism. The large flat pieces of material that forms the leg loops are designed to rest over the foreleg muscles; not in the sensitive foreleg pit area, and use exerted force against the foreleg muscles to restrain the animal. To overpower the strength of the foreleg muscles Bandimere teaches the use of a block and tackle mechanism. The mount of force generated by a block and tackle mechanism could potentially cause muscle or tendon injury to the dog or cause the dog to stumble, possibly causing injury to the dog or his master.

Therefore, the need exists for improved non-choking restraining devices to assist a person in training dogs to cure the habit of straining against the leash.

SUMMARY OF THE INVENTION

It is therefore an object of the present invention to provide small quadruped animal non-choking restraining devices which assist a person in training dogs to cure the habit of straining against the leash.

It is a further object of the present invention to provide small quadruped animal restraining devices which are easy to install on an animal, which can be installed only on an animal or which can be connected to and used in conjunction with any neck collar, which can apply pressure to the entire foreleg pit area including the anterior portion of the foreleg pit, which has leg loops that can contract without restriction to any size necessary to put pressure on the foreleg pit area, which has leg loops that remain loose around the foreleg pit area when the leash is not under tension, and which constricts in the foreleg pit areas with enough force to motivate a dog to stop straining against the leash when the leash is under only a few pounds of tension.

It is a still further object of the present invention to provide small quadruped animal restraining devices which do not require specially designed or constructed collars and/or leashes.

It is yet a further object of the present invention to provide small quadruped animal restraining devices which does not choke or hobble the quadruped animal, thereby significantly decreasing the risk of injury to the animal and its master.

It is still yet a further object of the present invention to provide small quadruped animal restraining devices which gives a master improved directional control, and which at the same time is simply constructed and does not require additional straps, hooks, loops or special collars which tend to increase the cost of the restraining devices.

The present invention provides restraining devices for use with small quadruped animals which have utility for use with any quadruped animal, regardless of its neck, chest or overall size, and which do not require a special collar or a collar connection. The restraining devices are comprised of a pair of substantially equal length cords with each cord having a first end, a second end opposite the first end and an intermediate portion between the first and second ends. Means are secured to the first end of each of the cords for allowing at least a portion of the intermediate portions of the cords to be passed through such means. When the intermediate portions of the cords are passed through such means each cord forms a leg loop positionable about and within one of the foreleg pits of the small quadruped animal. When an animal strains against a person holding the second ends of the cords, for example with a leash, it results in the contraction of the leg loops thereby applying pressure to the foreleg pits of the animal and encouraging the animal to stop straining and react in a desired controlled manner.

In an alternative embodiment, the restraining device further includes means for releasably attaching the first end to a collar on the animal. Furthermore, the restraining device can include means secured to the second end portion for receiving a leash.

It will be seen that the present invention provides simply constructed small animal restraining devices which do not choke or hobble the animal, and which do not require specially designed or constructed collars and/or leashes. Furthermore, it will be seen that such restraining devices, are easy to install on an animal, can be mounted solely on to an animal or used in conjunction with any neck collar, can cover the entire foreleg pit area, including the anterior portion of the foreleg pit area, have leg loops that can contract without restriction to any size necessary to put pressure on the anterior foreleg pit area of the animal, which remain loose around the foreleg pit area of the animal when the leash is not under tension, which easily and quickly constrict in the foreleg pit areas when placed under strain to provide enough pressure to motivate a dog to stop straining against the leash, will be taught. It will be further seen that the devices which are taught do not require specially designed or constructed collars and/or leashes, and that since they do not require additional straps, hooks, loops or special collars, that the cost of the restraining devices taught by the present invention can be maintained at a minimum.

BRIEF DESCRIPTION OF THE DRAWINGS

FIG. 1 is an top view illustrating a first embodiment of the small quadruped animal restraining device of the present invention;

FIG. 2 is a perspective view illustrating the first embodiment of the small animal restraining device of the present invention with the restraining device manipulated to receive the small animal to be restrained;

FIG. 5 is a top view illustrating the first embodiment of the small animal restraining device of the present invention manipulated as illustrated in FIG. 2 in use to restrain a dog;

FIG. 6 is a top view illustrating a second embodiment of the small animal restraining device of the present invention;

FIG. 7 is a perspective view illustrating the second embodiment of the small animal restraining device of the present invention with the restraining device manipulated to receive the small animal to be restrained;

FIG. 8 is a top view illustrating the second embodiment of the small animal restraining device of the present invention manipulated as illustrated in FIG. 7 in use to restrain a dog;

FIG. 9 is a top view illustrating a third embodiment of the small animal restraining device of the present invention;

FIG. 10 is a perspective view illustrating the third embodiment of the small animal restraining device of the present invention with the restraining device manipulated to receive the small animal to be restrained;

FIG. 11 is a top view illustrating the third embodiment of the small animal restraining device of the present invention manipulated as illustrated in FIG. 10 in use to restrain a dog;

FIG. 12 is a top view illustrating a fourth embodiment of the small animal restraining device of the present invention;

FIG. 13 is a perspective view illustrating the fourth embodiment of the small animal restraining device of the present invention with the restraining device manipulated to receive the small animal to be restrained;

FIG. 14 is yet another top view illustrating the fourth embodiment of the small animal restraining device of the present invention manipulated as illustrated in FIG. 13 in use to restrain a dog;

FIG. 15 is a perspective view illustrating the embodiment of the small animal restraining device of the present invention as shown in FIG. 9, with the restraining device manipulated to receive the small animal to be restrained, but showing how it can be used without connection to a dog collar;

FIG. 16 is yet another top view of the small animal restraining device of the present invention manipulated as illustrated in FIG. 15, and showing how it can be used without connection to a dog collar, in use to restrain a dog;

FIG. 17 is a perspective view illustrating the embodiment of the small animal restraining device of the present invention as shown in FIG. 12, with the restraining device manipulated to receive the small animal to be restrained, but showing how it can be used without connection to a dog collar;

FIG. 18 is yet another top view of the small animal restraining device of the present invention manipulated as illustrated in FIG. 17, and showing how it can be used without connection to a dog collar, in use to restrain a dog; and FIGS. 19 and 20 illustrate prior art animal restraint system which have been discussed above.

DETAILED DESCRIPTION OF THE PREFERRED EMBODIMENTS

Figure 3:
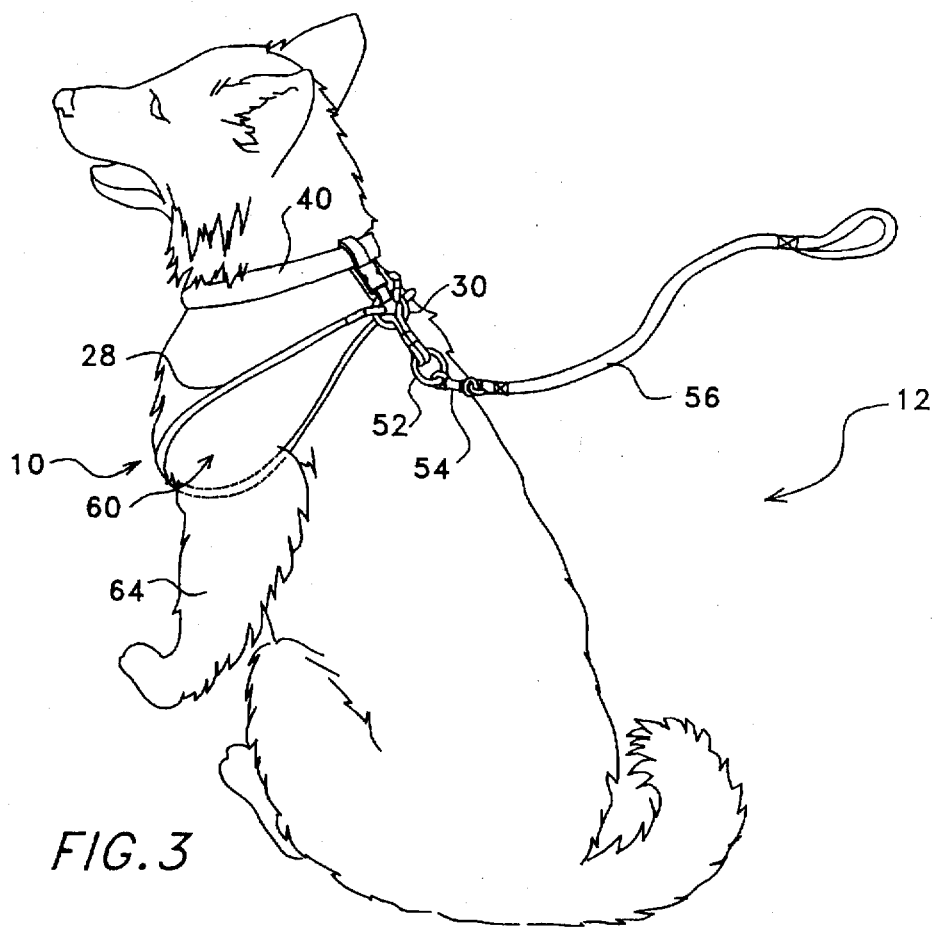
FIG. 3 is a perspective view illustrating the first embodiment of the small animal restraining device of the present invention with the restraining device in use together with a typical collar and leash to restrain a dog in a sitting position.

As illustrated in FIGS. 1–5, the present invention teaches a restraining device, indicated generally at 10, for restraining small quadruped animals. In discussing the small animal restraining device 10 of the present invention, a dog 12 will be used as the reference animal. It should be noted, however, that the restraining device 10 of the present invention is suitable for any small animal including, but not limited to, cats, pot belly pigs, miniature ponies and the like. Likewise, the dog referenced and discussed herein can be of any size, weight, shape or breed.

Still referring to FIGS. 1–5, the restraining device 10 includes a pair of substantially equal length flexible cables or cords 14, 16. While the cords 14, 16 are described as being substantially equal in length, cords of different lengths, while not preferred, are within the scope of the present invention.

The cords 14, 16 are preferably constructed of a length of tightly woven nylon material having a diameter of from about 1 to about 10 mm, although other diameters can be used. Other types of material, including, but not limited to, rope, twine, steel or aluminum cable or chains can be used for the cords 14, 16 and are within the scope of the present invention. The type of material and actual diameter of the cords 14, 16 are dependent on the type and strength of material used, and on the size and strength of the animal that is to be controlled.

For use with dogs, the length of the cords 14, 16 are preferably in the range of about twenty to about sixty inches. However, the length of the cords 14, 16 can be varied depending on the size of the small animal intended to be restrained and the amount of lead between the dog 12 and the person handling the dog 12 as further described below.

The cord 14 includes a first end portion 18, a second end portion 20 opposite the first end portion 18 and an intermediate portion 22 between the first end portion 18 and the second end portion 20. The cord 16 includes a first end portion 24, a second end portion 26 opposite the first end portion 24 and an intermediate portion 28 between the first end portion 24 and the second end portion 26.

Still referring to FIGS. 1–5, a receiving link or receiving slip ring 30 is attached to the first end portion 18, 24 of each cord 14, 16. The receiving slip ring 30 is preferably a rigid continuous ring of a smooth durable weather resistant material preferably, but not limited to, a corrosion resistant metal ring. The receiving ring 30 could also be constructed of plastic, wood or ceramic so long as it is sufficiently strong and durable to withstand the pulling and straining force of the dog 12. Furthermore, while a ring is, by definition, generally circular, the receiving slip ring 30 of the present invention can be circular, triangular, quadrangular, or have substantially any open shape with any number of sides.

In one preferred embodiment, the receiving slip ring 30 is attached to each cord 14, 16. This attachment may be achieved by any means, for example by wrapping an attaching portion 32, 34 of the first end portion 18, 24 of each of the cords 14, 16 about the receiving ring 30 until at least a portion of the attaching portion 32, 34 contacts the remaining first end portion 18, 24, respectively, of the cords 14, 16. Then, string, twine or tape (not shown) is wrapped around the attaching portion 32, 34 and the first end portions 18, 24 to bind the attaching portions 32, 34 and the first end portions 18, 24 together. To further secure the receiving ring 30 to the cords 14, 16, a flexible band 36 is placed over the string. The flexible band 36 assures that the string will not unravel about the attaching portions 32, 34 and the first end portions 18, 24 and also further securing the receiving ring 30 to the cords 14, 16. However, receiving ring 30 can be attached to the cords 14, 16, by any other art known means, for example by the use of dips, by crimping, or by heat sealing.

The receiving ring 30 should be sized large enough that the intermediate portions 22, 28 of the cords 14, 16 can easily slip through the receiving ring 30 with a minimum of resistance and small enough such that the first and second end portions 18, 24, 20, 26 of the cords 14, 16 are in dose proximity subsequent to the intermediate portions 22, 28 being slipped through the receiving ring 30 to get the maximum coverage of the sensitive foreleg pit area 62, including the anterior pit area, of a dog 12 which is to be restrained. The action of the restraining device 10 on the dog 12 to be restrained will be discussed in further detail below.

In this first embodiment of the present invention, a clip mechanism 38 is connected to the receiving ring 30 for releasably securing the restraining device 10 to a collar 40 (as illustrated in FIG. 5) of the dog 12. The clip mechanism 38 comprises an art known webbed strap 42 having a first end 44 and a second end 46 opposite the first end 44. A first clip portion 48 is attached to the first end 44 of the strap 42 and a second clip portion 50 for receiving the first clip portion 48 is attached to the second end 46 of the strap 42. The clip mechanism 38 is preferably attached to the receiving ring 30 by slipping the first clip portion 48 and the first end 44 of the strap 42 through the receiving ring 30. Then, if preferred, stitching (not shown) through the portion of the first end 44 of the strap 42 surrounding the receiving ring 30 will secure the clip mechanism 38 to the receiving ring 30 so that the clip mechanism 38 will not become detached from the receiving ring 30. Of course, other types of art known clip mechanism may be used for this purpose.

Further in the first embodiment, as illustrated in FIGS. 1–5, a leash connecting ring 52 is attached to the second end portions 20, 26 of the cords 14, 16. The leash connecting ring 52 is preferably constructed and attached in a similar fashion as the construction and attachment of the receiving ring 30 to the first end portions 18, 24 cords 14, 16, although any art known method of attachment may be used. The leash connecting ring 52 is sized and adapted to receive, as illustrated in FIG. 3, a clipping portion 54 of a typical leash 56. The function and use of the leash 56 connecting ring 52 will be described in further detail below.

Figure 4:
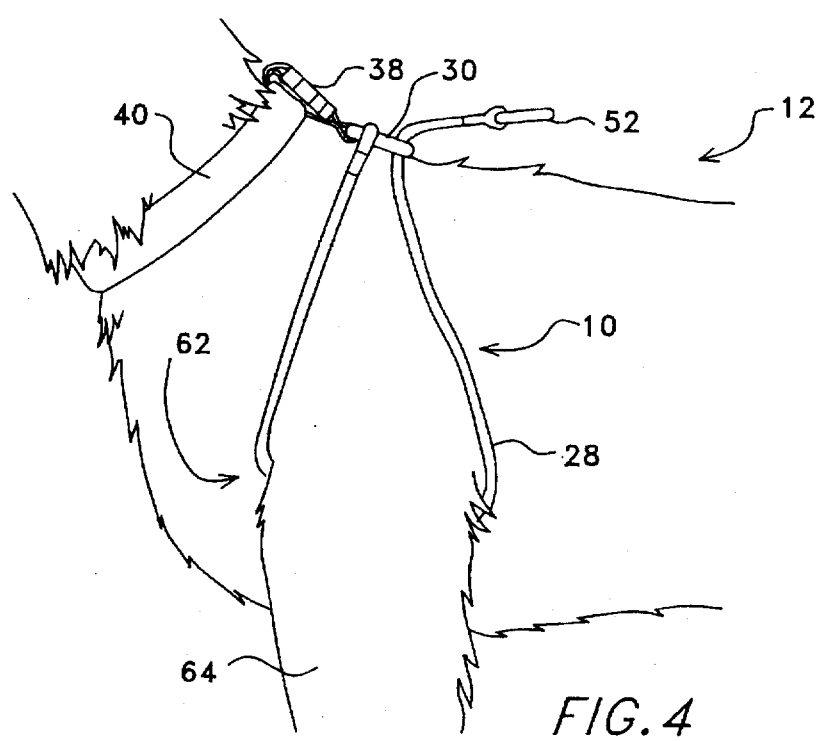
FIG. 4 is yet another perspective view illustrating the first embodiment of the small animal restraining device of the present invention in use to restrain a dog in a standing position.

As illustrated in FIG. 2, to complete the construction of the restraining device 10 of the first embodiment of the present invention, the intermediate portions 22, 28 of each of the cords 14, 16 are slipped through the receiving ring 30 thereby forming a pair of leg loops 58, 60 sized and adapted to receive the legs and surround the foreleg pits 62 of the dog 12, as illustrated in FIG. 4. As illustrated in FIG. 3, after each of the forelegs 64 of the dog 12 are inserted into the loops 58, 60, such that the receiving ring 30 is located medially on the shoulder area along the back of the dog 12 and the intermediate portions 22, 28 of each cord drape loosely under and adjacent the dog's sensitive foreleg pits 62. The second end portions 20, 26 extend away from the receiving ring 30 in a direction generally away from the back of the dog 12, and ends with ring 52.

In the case of this first embodiment of the present invention, the manipulation of the restraining device 10 to receive a dog 12 continues by connecting the clip mechanism 38 to the collar 40. This is accomplished by inserting the second clip portion 50 and the second end 46 of the strap 42 under the collar 40 and clipping the second clip portion 50 into the first clip portion 48. The leash 56 is then releasably attached to the leash connecting ring 52 in a known fashion. In operation, the person handling the dog 12 will pull on the leash 56 in response to the dog's movements, or the straining movement of the dog will pull against the leash. In either event, the second end portions 20, 26 are urged in a direction away from the dog 12. Either action causes the loops 58, 60 positioned within the foreleg pits 62 of the dog 12 to constrict into the sensitive area of the foreleg pits 62 thereby encouraging the dog 12 to act in a way consistent with its masters desires.

FIGS. 6–8 illustrate the restraining device 110 of a second embodiment of the present invention. The restraining device 110 is similar to the restraining device 10 of the first embodiment except that the leash attaching ring 52 is replaced by a pair of somewhat smaller rings 152 which make the leash easier to mount on a dog. The control rings 152 allow a person to directionally control the dog 12 by pulling on either cord 14, 16 thereby exerting pressure on either or both of the foreleg pits 62.

FIGS. 9–11 illustrate the restraining device 210 of a third embodiment of the present invention. The restraining device 210 is similar to the restraining device 10 of the first embodiment of the present invention, including a control ring 252, except that the restraining device 210 does not include a clip mechanism. Instead, a collar attachment loop 238 is formed by working a portion of the intermediate portions 22, 28 of the cords 14, 16 adjacent the first end portions 18, 24 of the cords 14, 16 back through the receiving ring 30, with each cord forming a separate loop to be disposed within one of the foreleg pits of the small animal. The collar 40 of the dog 12 is then inserted into the attachment loop 238. As the person pulls on the cords 14, 16 in reaction to the dog's movement, the collar attachment loop 238 will constrict about the collar 40 thereby further securing the restraining device 210 to the collar 40 without the need for a clip mechanism.

FIGS. 12–14 illustrate the restraining device 310 of a fourth embodiment of the present invention. The restraining device 310 is similar to the restraining device 210 of the third embodiment, and in addition includes control rings 352 similar to control rings 152 of second embodiment to exercise directional control over the dog 12, but like the third embodiment, it differs from the first and second embodiment, it uses intermediate portions of loops 22 and 28 to form a collar attachment loop 338, instead of using a separate clip mechanism.

FIGS. 15–16 illustrate the restraining device 410 of a fifth embodiment of the present invention which is similar to the restraining device 410 of the third embodiment of the present invention, including a control ring 452, except that the restraining device 410 does not need to be connected to a collar. Instead the restraining device 410 is formed by passing the intermediate portions 22, 28 of each of the cords 14, 16 through the receiving ring 30, with each cord forming a separate loop to be disposed within both of the foreleg pits of the small animal. There is no need for a separate collar. As the person pulls on the cords 14, 16 in reaction to the dog's movement, the cords 14, 16 constrict about the animals foreleg pits without the need for a clip mechanism or any attachment to a collar.

FIGS. 17–18 illustrate the restraining device 510 of a sixth embodiment of the present invention. The restraining device 510 is similar to the restraining device 410 of the fifth embodiment, and in addition includes control rings 552 similar to control rings 352 of the fourth embodiment to exercise directional control over the dog 12, but, like the fifth embodiment, it uses no clip mechanism or any attachment to a collar.

One of the unique features of the restraining devices 10, 110, 210, 310, 410 and 510 of the present invention is that the leg loops 58, 60 are designed and constructed without any encumbering assemblies such that the leg loops 58, 60 are contractible to any size necessary to constrict in the sensitive foreleg pits 62 of any size, shape, or breed of dog. It should be noted that the leg loops 58, 60 are constructed of sufficient size so that the cords 14, 16 do not unnecessarily constrict into the foreleg pits 62 and injure the dog 12. However, the leg loops 58, 60 should provide contact with the sensitive foreleg pits area 62 so that the cords 14, 16 constricting force is not distributed over too large a portion of the dogs foreleg pits 62, thereby dissipating its restraining effect.

The restraining devices of the present invention are designed to fit any size or type of small animal without the prerequisite of a special collar or specially available connecting rings on any dog collar, and indeed, without any dog collar whatsoever. This is achieved by using the clip mechanism 38, or the structure of loops 238 or 338, as described, above to releasably and removably attach the restraining device to an ordinary dog or animal collar. In the latter embodiments, as described above, no clip mechanism is required to attach the restraining device 10 to an ordinary dog collar, but instead, intermediate portions of the cords 14, 16 are used to form loops 238 or 338 to connect it to a collar. In yet other embodiments, as described above, no clip mechanism or any attachment to a collar is required. Therefore, while being particularly described as being connected to any typical collar, it should be understood that, as described above, the restraining devices of the present invention can be utilized without a collar.

The underlying purpose of the restraining devices of the present invention is to enhance and encourage the motivational control of the dog 12 by a person through a process that converts a tension of more than a few pounds, between the restraining device and the person, into a constricting force on the animal's sensitive foreleg pits 62. When a dog 12 with the restraining devices 10, 110, 210, 310, 410, 510 of the present invention lunges or strains on the leash 56, or the person holding the leash 56 pulls back on the leash 56, the energy is transferred through the leash attachment ring 52, 152, 252, 352, 452, 552 to intermediate portions 22, 28 which form the leg loops 58, 60. This energy causes the leg loops 58, 60 to contract as they slide through the receiving ring 30 until the cords of the intermediate portions 22, 28 contact the dog's sensitive foreleg pits 62.

If the dog 12 resists movement with a greater amount of force, the leg loops 58, 60 constrict further putting a greater constricting force on the sensitive foreleg pits 62. The dog 12 can control the constricting pressure on his sensitive foreleg pits 62 by not straining on the leash 56 or by moving in the direction the person is pulling on the leash 56. When the straining ceases there is no tension between the restraining device and the leash 56. The flexibility and weight of the cord, either alone or in conjunction with the normal expansion of the chest, through breathing or through muscle expansion or contraction, causes the leg loops 58, 60 to slide back though the receiving ring 30, thereby expanding the leg loops 58, 60 and terminating the constricting force in the foreleg pits 62, thereby immediately relieving the dog of pain in the foreleg pit area.

It is therefore seen that the present invention provides simply constructed small animal restraining devices which do not choke or hobble the animal, and which do not require specially designed or constructed collars and/or leashes. It is further seen that it teaches such restraining devices which are easy to install on an animal, which can be mounted solely on an animal or used in conjunction with any neck collar, which can cover the entire foreleg pit area, which have leg loops that can contract without restriction to any size necessary to put pressure on the anterior foreleg pit area of the animal, which remain loose around the foreleg pit area of the animal when the leash is not under tension, which easily and quickly constrict in the foreleg pit areas when placed under strain to provide enough pressure to motivate a dog to stop straining against the leash. It will be further appreciated that the devices which are taught do not require specially designed or constructed collars and/or leashes. Furthermore, such restraining devices, which do not choke or hobble, significantly decrease the risk of injury to the animal, as well as to its master while giving the master improved control. Finally, it is seen that since the devices of the present invention do not require additional straps, hooks, loops or special collars, that the cost of the restraining devices can be maintained at a minimum.

The foregoing exemplary description and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. Restraining devices for use with small quadruped animals having a pair of forelegs and a pair of foreleg pits, the restraining devices comprising:

a pair of substantially flexible single cords, each single cord having a first end, a second end opposite said first end, and an intermediate portion between said first and second ends, said intermediate portions of each said single cord being separate and unconnected to the other single cord; and means secured to said first end of each of said single cords for slidably receiving at least a portion of the intermediate portions of each said single cord, said intermediate portions of each said single cord forming a single independent and unconnected foreleg loop positionable within one of the foreleg pits of the small animal, including the anterior area of each pit; whereby when a small quadruped animal has its forelegs placed within said loops each of its foreleg pits, including the anterior area is, surrounded by said intermediate portions of said cords, and, straining against said second ends of said cords results in the contraction of the leg loops, thereby applying pressure to the entire area of the foreleg pits of the animal and encouraging the animal to react to relieve the pressure applied to the foreleg pits.

2. The restraining devices of claim 1 wherein said cords are selected from the group consisting of woven material, rope, twine, steel cable, aluminum cable, and chain links.

3. The restraining devices of claim 1 wherein said cords have a diameter of from about 1 to about 10 mm.

4. The restraining devices of claim 1 wherein said cords have a length in the range of about twenty to about sixty inches.

5. The restraining devices of claim 1 wherein said receiving means includes a slip ring.

6. The restraining devices of claim 1 and further including means for releasably attaching said receiving means to a collar on the animal.

7. The restraining devices of claim 6 wherein said attaching means includes a clip mechanism.

8. The restraining devices of claim 1 and further including means secured to said second ends of said cords for receiving a leash.

9. The restraining devices of claim 8 wherein said receiving means comprises at least one ring.

10. The restraining devices of claim 1 wherein said cords are of substantially equal length.

11. A small quadruped animal harness adapted to be coupled to any neck collar and to any leash to control a small quadruped animal wearing any neck collar from straining against such a leash coupled to said harness;

a pair of substantially equal length single cords, each cord having a first end, a second end, and an intermediate portion, said intermediate portions of each said single cord being separate and unconnected to the other single cord;

a slip ring, said first end of each single cord being secured to said slip ring, the portion of each single cord adjacent to said slip ring being adapted to be first passed around any collar worn by a small quadruped animal to removably attach said single cords to such a collar, with the intermediate portion of each said cord then passed through said slip ring with each cord forming a single separate, independent and unconnected loop to be disposed within one of the foreleg pits, including the anterior area of the foreleg pits of such a small quadruped animal; and means for receiving a leash, said leash receiving means being sized to bar its passage through said slip ring, said second end of each cord being secured to said leash receiving means; whereby, when a small quadruped animal wearing any collar is wearing said harness and any leash is attached to said leash receiving means and held, and the leash and said harness are unstrained, said independent and unconnected loops formed by each independent and unconnected cord are loose and do not apply pressure to the foreleg pits of the small quadruped animal, and when the leash and said harness are strained said independent and unconnected loops formed by each independent and unconnected cord apply pressure to each of the foreleg pits of the small quadruped animal, including the anterior area, thereby causing the animal to react to decrease the pressure on its foreleg pits.

12. The harness of claim 11 wherein the leash receiving means comprises a leash loop having a diameter equal to or greater than said slip ring to prevent said leash loop from passing through said slip ring.

13. A method of restraining a small quadruped animal having a pair of forelegs, each foreleg having a foreleg pit, the method comprising:

providing a pair of independent and unconnected single cords having a first end, a second end opposite said first end and an intermediate portion between said first and second ends, and having a slip ring connected to said first end of said cords, said intermediate portions of said single cords being separate and independent of one another;

passing said intermediate portion of each said single cord through said slip ring thereby forming a single, independent, unconnected leg loop from each said single cord;

inserting the two forelegs of the small quadruped animal into the two independent and unconnected leg loops formed from each said single cord such that said intermediate portion of said cords rests in the foreleg pits of the small quadruped animal with no portion of the cords crossing over the chest of the animal; and contracting said leg loops into the entire area of the foreleg pits, including the anterior area of the pits, to encourage the small quadruped animal to react in a desired manner.

14. The method of claim 13 further including providing a clip mechanism attached to said slip ring and releasably securing said clip mechanism to a collar about the neck of the small quadruped animal.

15. The method of claim 13 further including providing a leash loop secured to said second end of said cords for receiving a leash, and releasably securing leash to said leash loop.

* * * * *